(12) United States Patent
Tsukamoto et al.

(10) Patent No.: US 12,270,088 B2
(45) Date of Patent: Apr. 8, 2025

(54) STEEL SHEET AND METHOD FOR MANUFACTURING SAME

(71) Applicant: NIPPON STEEL CORPORATION, Tokyo (JP)

(72) Inventors: Eriko Tsukamoto, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 632 days.

(21) Appl. No.: 17/635,193

(22) PCT Filed: Oct. 9, 2020

(86) PCT No.: PCT/JP2020/038262
§ 371 (c)(1),
(2) Date: Feb. 14, 2022

(87) PCT Pub. No.: WO2021/070925
PCT Pub. Date: Apr. 15, 2021

(65) Prior Publication Data
US 2022/0290269 A1    Sep. 15, 2022

(30) Foreign Application Priority Data

Oct. 9, 2019    (JP) .................................. 2019-185996

(51) Int. Cl.
*C21D 9/46*    (2006.01)
*B32B 15/01*    (2006.01)
(Continued)

(52) U.S. Cl.
CPC .............. *C21D 9/46* (2013.01); *B32B 15/013* (2013.01); *C21D 6/001* (2013.01); *C21D 6/002* (2013.01);
(Continued)

(58) Field of Classification Search
CPC ..... C22C 38/00; C22C 38/001; C22C 38/002; C22C 38/005; C22C 38/008; C22C 38/02; C22C 38/04; C22C 38/06; C22C 38/08; C22C 38/10; C22C 38/12; C22C 38/14; C22C 38/16; C22C 38/38; C22C 38/60;
(Continued)

(56) References Cited

U.S. PATENT DOCUMENTS

2010/0132849 A1    6/2010    Takagi et al.
2010/0236668 A1*    9/2010    Hara ........................ C22C 38/44
148/330

(Continued)

FOREIGN PATENT DOCUMENTS

CN    101939456 A    1/2011
EP    2 267 176 A1    12/2010
(Continued)

*Primary Examiner* — Lois L Zheng
(74) *Attorney, Agent, or Firm* — Birch, Stewart, Kolasch & Birch, LLP

(57) ABSTRACT

This steel sheet has a predetermined chemical composition, the metallographic structure includes, by an area ratio, ferrite, bainite and pearlite: 0 to 10% in total, residual austenite: 1 to 15%, and a remainder that is martensite, and a proportion of martensite or residual austenite having a width of 50 nm to 2 μm present at a prior austenite grain boundary is 70% or more.

14 Claims, 1 Drawing Sheet

(51) Int. Cl.
| | |
|---|---|
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/38* | (2006.01) |
| *C23C 2/02* | (2006.01) |
| *C23C 2/28* | (2006.01) |
| *C23C 2/40* | (2006.01) |

(52) U.S. Cl.
CPC ............. *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/38* (2013.01); *C23C 2/02* (2013.01); *C23C 2/0224* (2022.08); *C23C 2/024* (2022.08); *C23C 2/28* (2013.01); *C23C 2/40* (2013.01); *C21D 2211/008* (2013.01)

(58) Field of Classification Search
CPC ......... C23C 2/02; C23C 2/0224; C23C 2/024; C23C 2/06; C23C 2/28; C23C 2/40; C21D 1/18; C21D 2211/01; C21D 2211/008; C21D 6/001; C21D 6/002; C21D 6/005; C21D 6/007; C21D 6/008; C21D 8/0205; C21D 8/0226; C21D 8/0236; C21D 8/0263; C21D 8/0273; C21D 9/46; B32B 15/013
See application file for complete search history.

(56) References Cited

U.S. PATENT DOCUMENTS

| | | |
|---|---|---|
| 2011/0198002 A1 | 8/2011 | Nakagaito et al. |
| 2014/0162088 A1 | 6/2014 | Kawata et al. |
| 2021/0017622 A1 | 1/2021 | Haga et al. |

FOREIGN PATENT DOCUMENTS

| | | |
|---|---|---|
| JP | 6421903 B1 | 11/2018 |
| JP | 2019-2078 A | 1/2019 |
| WO | WO 2013/018722 A1 | 2/2013 |

\* cited by examiner

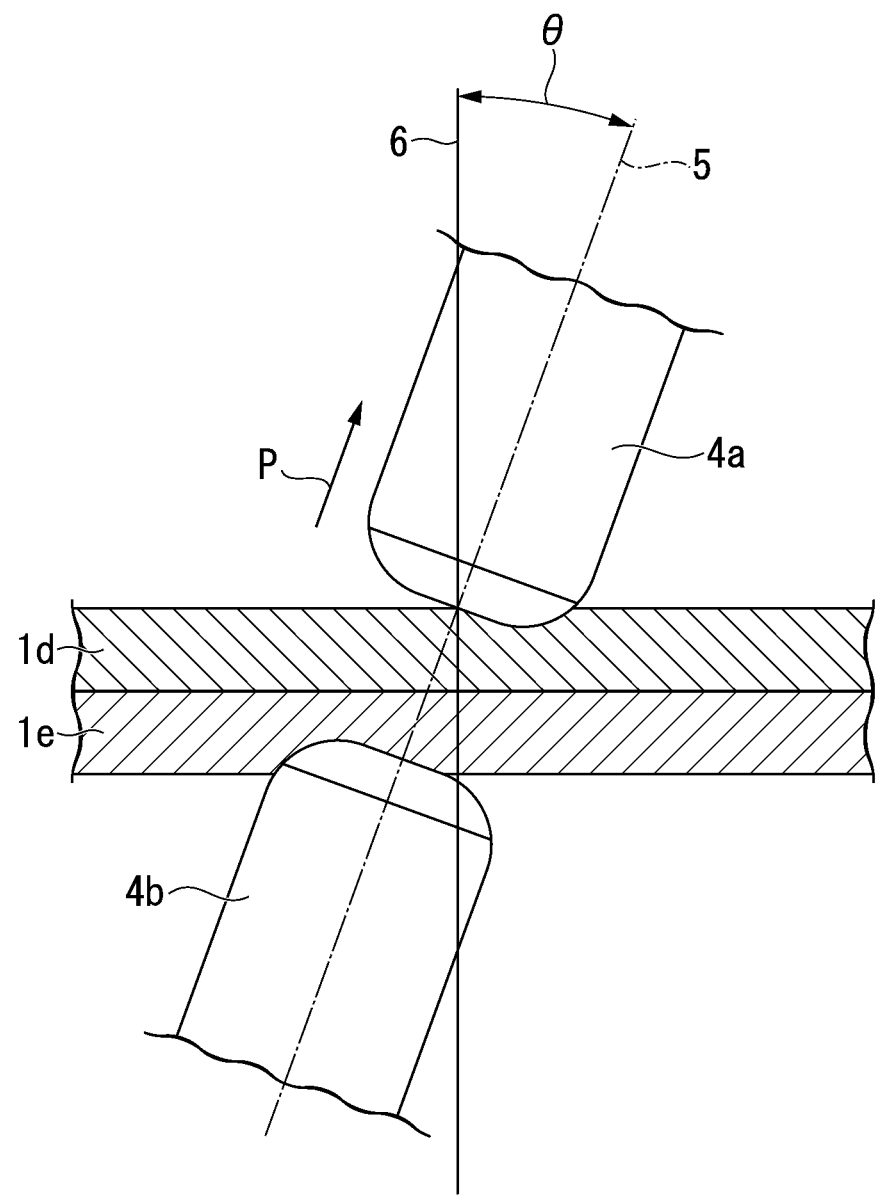

US 12,270,088 B2

STEEL SHEET AND METHOD FOR MANUFACTURING SAME

TECHNICAL FIELD OF THE INVENTION

The present invention relates to a steel sheet and a method for manufacturing the same.

Priority is claimed on Japanese Patent Application No. 2019-185996, filed in Japan on Oct. 9, 2019, the content of which is incorporated herein by reference.

RELATED ART

In order to suppress the amount of carbon dioxide exhausted from automobiles, attempts are underway to reduce the weights of automobile vehicle bodies while ensuring safety by using high strength steel sheets. However, in general, when the strength of a steel sheet is increased, the formability deteriorates. In high strength steel sheets, it is difficult to satisfy both strength and formability, and several measures have been proposed to solve this problem.

For example, Patent Document 1 discloses an ultrahigh strength steel sheet containing, by mass %, each of C: 0.15% to 0.35%, Si: 0.5% to 3.0%, Mn: 0.5% to 1.5%, and Al: 0.001% to 0.10%, in which the remainder includes iron and unavoidable impurities, the content of a predetermined composition among the unavoidable impurities is limited, a structure including 90% or more of martensite and 0.5% or more of residual austenite in terms of an area ratio with respect to the entire structure is present, 1% or more of a region in which a local Mn concentration becomes 1.2 times or more the Mn content of the entire steel sheet is present in terms of the area ratio, the tensile strength is 1470 MPa or more, the yield ratio is 0.75 or more, and the total elongation is 10% or more.

Patent Document 2 discloses a hot-dip galvanized steel sheet having a hot-dip galvanized layer on a surface of a steel sheet, in which the composition of the steel sheet contains, by mass %, C: 0.03% to 0.70%, Si: 0.25% to 2.50%, Mn: 1.00% to 5.00%, P: 0.0005% to 0.100%, S: 0.010% or less, sol. Al: 0.001 to 2.500%, N: 0.020% or less, B: 0% to 0.0200%, Ti: 0% to 0.30%, Nb: 0% to 0.30%, V: 0% to 0.30%, Cr: 0% to 2.00%, Mo: 0% to 2.00%, Cu: 0% to 2.00%, Ni: 0% to 2.00%, Ca: 0% to 0.010%, Mg: 0% to 0.010%, REM: 0% to 0.10%, and Bi: 0% to 0.050%, the remainder is Fe and unavoidable impurities, the metallographic structure of the steel sheet contains, by volume %, more than 5.0% of residual austenite, and more than 5.0% of tempered martensite, the residual austenite contains 0.85 mass % or more of C, and the ratio: $[C]_{\gamma gb}/[P]_{\gamma gb}$ between the amount (number of atoms/nm$^2$) of C segregated in prior austenite grain boundaries in the metallographic structure of the steel sheet: $[C]_{\gamma gb}$ and the amount (number of atoms/nm$^2$) of P segregated: $[P]_{\gamma gb}$ is 4.0 or more.

PRIOR ART DOCUMENT

Patent Document

[Patent Document 1] Japanese Unexamined Patent Application, First Publication No. 2019-2078
[Patent Document 2] Japanese Patent No. 6421903

DISCLOSURE OF THE INVENTION

Problems to be Solved by the Invention

In Patent Document 1 and Patent Document 2, a general yield strength (yield ratio) has been examined; however, in view of a recent demand for the weight reduction of automobile vehicle bodies, steel sheets are required to have more preferable characteristics. Specifically, it is preferable to increase the elastic limit to widen the elastic deformation region because the impact energy absorption performance of the steel sheets improves.

In view of the above description, an object of the present invention is to provide a steel sheet having a tensile strength of 1310 MPa or more and having a work hardening rate of more than 180 GPa that is maintained up to a region where a true stress value is 600 MPa or more in a stress-strain curve and a method for manufacturing the same.

Means for Solving the Problem

The present invention has been made based on the above-described finding, and the gist of the present invention is as described below.

[1] A steel sheet according to one aspect of the present invention contains, as a chemical composition, by mass %:
  C: 0.20% to 0.40%,
  Si: 0.10% to 1.0%,
  Al: 0.20% to 1.0%,
  Mn: 0.1% to 4.0%,
  P: 0.0200% or less,
  S: 0.0200% or less,
  N: 0.0200% or less,
  O: 0.0200% or less,
  Ni: 0% to 1.00%,
  Mo: 0% to 1.00%,
  Cr: 0% to 2.000%,
  Ti: 0% to 0.500%,
  B: 0% to 0.0100%,
  Nb: 0% to 0.500%,
  V: 0% to 0.500%,
  Cu: 0% to 0.500%,
  W: 0% to 0.10%,
  Ta: 0% to 0.10%,
  Sn: 0% to 0.050%,
  Co: 0% to 0.50%,
  Sb: 0% to 0.050%,
  As: 0% to 0.050%,
  Mg: 0% to 0.050%,
  Ca: 0% to 0.040%,
  Y: 0% to 0.050%,
  Zr: 0% to 0.050%,
  La: 0% to 0.050%, and
  a remainder including iron and impurities,
  Si+Al satisfies 0.30% to 1.4%,
  a metallographic structure in a sheet thickness ¼ portion includes, by an area ratio,
  ferrite, bainite and pearlite: 0% to 10% in total
  residual austenite: 1% to 15%, and
  a remainder that is martensite, and
  a proportion of martensite or residual austenite having a width of 50 nm to 2 μm present at a prior austenite grain boundary is 70% or more.

[2] The steel sheet according to [1], in which the chemical composition may contain, by mass %, one or more selected from the group consisting of
  Ni: 0.01% to 1.00%,
  Mo: 0.01% to 1.00%,
  Cr: 0.001% to 2.000%,
  Ti: 0.001% to 0.500%,
  B: 0.0001% to 0.0100%,
  Nb: 0.001% to 0.500%,
  V: 0.001% to 0.500%, Cu: 0.001% to 0.500%,
W: 0.001% to 0.10%,
Ta: 0.001% to 0.10%,
Sn: 0.001% to 0.050%,
Co: 0.001% to 0.50%,
Sb: 0.001% to 0.050%,
As: 0.001% to 0.050%,
Mg: 0.0001% to 0.050%,
Ca: 0.001% to 0.040%,
Y: 0.001% to 0.050%,
Zr: 0.001% to 0.050%, and
La: 0.001% to 0.050%.

[3] The steel sheet according to [1] or [2] may have a hot-dip galvanized layer on a surface.

[4] The steel sheet according to [1] or [2] may have a hot-dip galvannealed layer on a surface.

[5] The steel sheet according to any one of [1] to [4], in which a grain boundary thickness of prior austenite may be 50 nm to 2 μm.

[6] A method for manufacturing a steel sheet according to another aspect of the present invention having a hot rolling step of hot rolling a slab having the chemical composition according to [1] or [2] to obtain a hot rolled steel sheet, a cold rolling step of pickling and then cold rolling the hot rolled steel sheet to obtain a cold rolled steel sheet, and
an annealing step of annealing the cold rolled steel sheet,
in which, in the annealing step,
the cold rolled steel sheet is heated at a heating rate of 1.0° C./s or slower in a temperature range starting from 830° C. and ending at 1° C. that is a temperature of 840° C. to 900° C.,
held at the 1° C. for $\{T/13-(100\times Si)^{0.8}-(70\times Al)^{0.5}\}$ seconds or longer, and,
after being held, cooled at an average cooling rate of 20° C./s to 60° C./s up to a cooling stop temperature of 300° C. or lower.

[7] The method for manufacturing a steel sheet according to [6], in which the cold rolled steel sheet after the annealing step may be controlled to be in a temperature range of (galvanizing bath temperature–40)° C. to (galvanizing bath temperature+50)° C. and immersed in a hot-dip galvanizing bath, thereby forming a hot-dip galvanizing

[8] The method for manufacturing a steel sheet according to [7], in which the hot-dip galvanizing may be alloyed in a temperature range of 300° C. to 500° C.

Effects of the Invention

According to the present invention, it is possible to provide a steel sheet having a tensile strength of 1310 MPa or more and having a work hardening rate of more than 180 GPa that is maintained up to a region where a true stress value is 600 MPa or more in a stress-strain curve and a method for manufacturing the same.

BRIEF DESCRIPTION OF THE DRAWINGS

FIG. 1 is a schematic view showing an appearance of a test in which two steel sheets are spot-welded and liquid metal embrittlement cracking resistance is evaluated.

EMBODIMENTS OF THE INVENTION

Hereinafter, a steel sheet according to the present embodiment and a method for manufacturing the same will be described with reference to the drawing as appropriate.

The steel sheet according to the present embodiment contains, as a chemical composition, by mass %,
C: 0.20% to 0.40%,
Si: 0.10% to 1.0%,
Al: 0.20% to 1.0%,
Mn: 0.1% to 4.0%,
P: 0.0200% or less,
S: 0.0200% or less,
N: 0.0200% or less,
O: 0.0200% or less,
Ni: 0% to 1.00%,
Mo: 0% to 1.00%,
Cr: 0% to 2.000%,
Ti: 0% to 0.500%,
B: 0% to 0.0100%,
Nb: 0% to 0.500%,
V: 0% to 0.500%,
Cu: 0% to 0.500%,
W: 0% to 0.10%,
Ta: 0% to 0.10%,
Sn: 0% to 0.050%,
Co: 0% to 0.50%,
Sb: 0% to 0.050%,
As: 0% to 0.050%,
Mg: 0% to 0.050%,
Ca: 0% to 0.040%,
Y: 0% to 0.050%,
Zr: 0% to 0.050%,
La: 0% to 0.050%, and
a remainder including iron and impurities,
Si+Al satisfies 0.30% to 1.4%,
a metallographic structure in a sheet thickness ¼ portion includes, by an area ratio,
ferrite, bainite and pearlite: 0% to 10% in total
residual austenite: 1% to 15%, and
a remainder that is martensite, and
a proportion of martensite or residual austenite having a width of 50 nm to 2 μm present at a prior austenite grain boundary is 70% or more.

Hereinafter, the steel sheet according to one aspect of the present invention will be described.

First, the metallographic structure of the steel sheet according to the present embodiment will be described. Hereinafter, microstructural fractions are measured by image processing and thus expressed as area ratios, but the area ratios here may be regarded as volume percentages. Therefore, the unit "%" of the microstructural fractions shall mean volume %.

Metallographic Structure

Ferrite, bainite and pearlite: 0% to 10% in total

Ferrite is a soft structure and is thus easily distorted and is a structure that contributes to improvement in elongation. However, in order to obtain a preferable strength, the area ratio of ferrite needs to be limited.

Bainite is a phase that is obtained by holding steel at 350° C. or higher and 450° C. or lower for a certain period of time after annealing. Bainite is soft compared with martensite and thus has an effect of improving ductility; however, in order to obtain a preferable strength, similar to ferrite, the area ratio needs to be limited.

Pearlite is a structure containing full hard cementite, acts as a starting point of voids being generated at the time of hole expansion, and degrades hole expansibility. Therefore, similar to ferrite and bainite, the area ratio needs to be limited.

Therefore, in the steel sheet according to the present embodiment, the area ratio of ferrite, bainite and pearlite is 10% or less in total. Because ferrite, bainite and pearlite may not be contained, the lower limit thereof is 0%.

Residual Austenite: 1% to 15%

Residual austenite improves ductility by a TRIP effect and contributes to improvement in uniform elongation. Therefore, the area ratio of residual austenite is set to 1% or more.

On the other hand, when the area ratio of residual austenite becomes excessive, the grain size of residual austenite increases. Residual austenite having such a large grain size becomes coarse and full hard martensite after distortion. In this case, residual austenite is likely to act as a starting point of cracking and degrades the hole expansibility, which is not preferable. Therefore, the area ratio of residual austenite is set to 15% or less, preferably 12% or less, and more preferably 10% or less.

Remainder: Martensite

The structure of a remainder other than ferrite, bainite, pearlite and residual austenite is martensite. Here, martensite is a general term of so-called fresh martensite and tempered martensite.

Fresh martensite is a full hard structure having a high dislocation density and is thus a structure that contributes to improvement in tensile strength.

Tempered martensite is, similar to fresh martensite, a collection of lath-shaped grains. On the other hand, unlike fresh martensite, tempered martensite has a full hard structure containing a fine iron-based carbide therein by tempering. Tempered martensite can be obtained by tempering martensite formed by cooling or the like after annealing through a heat treatment or the like.

Bainite is also a structure containing a fine iron-based carbide, but can be distinguished from tempered martensite due to the fact that, in tempered martensite, there are a plurality of variants of the iron-based carbide; however, in bainite, there is a single variant of the iron-based carbide.

Proportion of martensite or residual austenite having width of 50 nm to 2 µm present in prior austenite grain boundaries being 70% or more In a case where the proportion of martensite or residual austenite having a width of 50 nm to 2 µm present in prior austenite grain boundaries (hereinafter, referred to as prior γ grain boundaries in some cases) is less than 70%, a region where martensite or residual austenite is not present becomes wide. In the region where martensite or residual austenite is not present, micro-yielding occurs preferentially. Therefore, it is difficult to inhibit the movement of dislocations, and it becomes difficult to suppress micro-yielding during tensile distortion, which is not preferable. Therefore, in the steel sheet according to the present embodiment, the proportion of martensite or residual austenite having a width of 50 nm to 2 µm present in the prior austenite grain boundaries is set to 70% or more and preferably 80% or more.

The proportion of martensite or residual austenite having a width of 50 nm to 2 µm present in the prior austenite grain boundaries is ideally 100%, but the actual upper limit is approximately 98%.

In a case where the width of martensite or residual austenite is less than 50 nm, the micro-yielding suppression effect is insufficient. Therefore, in the present embodiment, the width of martensite or residual austenite is set to 50 nm or more.

On the other hand, in a case where the width of martensite or residual austenite is more than 2 µm, that part becomes too hard to generate a difference in strength from the surrounding soft phases and to be likely to act as a starting point for the generation of voids, which is not preferable. Therefore, in the present embodiment, the width of martensite or residual austenite is set to 2 µm or less.

As long as the proportion of martensite or residual austenite having a width of 50 nm to 2 µm present in the prior austenite grain boundaries, that is, the grain boundary coverage is 70% or more, the other requirements for martensite or residual austenite that covers the prior austenite grain boundaries are not particularly limited. For example, if the grain boundary coverage is 70% or more, even when martensite or residual austenite having a width of less than 50 nm or more than 2 µm is present at the prior austenite grain boundaries, it is possible to inhibit the movement of dislocations and thereby suppress micro-yielding during tensile distortion. Therefore, it is permitted for martensite or residual austenite having a width of less than 50 nm or more than 2 µm to be present in the prior austenite grain boundaries.

On the other hand, in addition to the grain boundary coverage, the grain boundary thickness of prior austenite may be limited within a range of 50 nm to 2 µm. The grain boundary thickness of prior austenite is the average value of the width of martensite or residual austenite that covers the prior austenite grain boundaries. In the measurement of the grain boundary thickness, the width of the prior austenite grain boundary not covered with martensite or residual austenite is regarded as 0 nm. The micro-yielding suppression effect is further enhanced by limiting the grain boundary thickness within the range of 50 nm to 2 µm.

Next, the identification of ferrite, bainite, pearlite, residual austenite, and martensite and the calculation of the area ratios will be described.

The identification of each metallographic structure and the calculation of the area ratio can be performed by observing a 100 µm×100 µm region of a cross section that is along the rolling direction of the steel sheet and perpendicular to the sheet surface in a sheet thickness ¼ portion at a magnification of 1000 to 50000 times with EBSD (electron back scattering diffraction), X-ray measurement, corrosion using a Nital reagent or a LePera solution, and a scanning electron microscope.

The volume percentage of residual austenite can be calculated by measuring diffraction intensities using X-rays.

In the measurement using X-rays, a portion from the sheet surface of a sample to a depth ¼ position is removed by mechanical polishing and chemical polishing, and the microstructural fraction of residual austenite can be calculated from the integrated intensity ratio of the diffraction peaks of (200) and (211) of a bcc phase and (200), (220), and (311) of an fcc phase using MoKα rays at a sheet thickness ¼ position. As a general calculation method, the 5-peak method is used.

The area ratio of martensite is obtained in the following order. An observed section of the sample is etched with a LePera solution, and a 100 µm×100 µm region in a sheet thickness ⅛ to ⅜ range in which a sheet thickness ¼ portion is centered is observed with an FE-SEM. Because martensite and residual austenite are not corroded by LePera corrosion, the area ratios of uncorroded regions are the total area ratio of martensite and residual austenite. The area ratio of martensite can be calculated by subtracting the area ratio of residual austenite measured by X-rays from the area ratios of these uncorroded regions. As the area ratio of martensite, the average value of area ratios measured at three places is used.

Martensite can be distinguished from other structures in an electron channeling contrast image captured with a scanning electron microscope. In the above-described image, a region having a high dislocation density and having a substructure such as a block or a packet in grains is martensite.

In addition, tempered martensite can also be distinguished from bainite due to the fact that cementite in the structure has a plurality of variants.

Structures that have not been identified as residual austenite or martensite are determined as ferrite, bainite or pearlite by the above-described method.

The proportion of martensite or residual austenite having a width of 50 nm to 2 μm present in the prior austenite grain boundaries is measured in the following manner.

An observed section of the sample is corroded with a Nital reagent, and a 100 μm×100 μm region in a sheet thickness ⅛ to ⅜ range in which a sheet thickness ¼ portion is centered is observed using an FE-SEM. Retained γ or martensite in which carbon has concentrated is slowly corroded and appears to stand out white. Structures that stand out white in a rim shape are determined as martensite or residual austenite that is present in the prior γ grain boundaries. Because the prior γ grains can be specified by an inverse analysis of the EBSD measurement results, the grain boundary lengths L of 10 prior γ grains arbitrarily extracted from the 100 μm×100 μm region are obtained by an image analysis. In addition, the lengths I of portions covered with martensite and/or residual austenite having a width of 50 nm to 2 μm in the prior γ grain boundaries can be obtained by the image analysis of an SEM photograph of the corresponding portion. The proportion of martensite or residual austenite having a width of 50 nm to 2 mm present in the prior γ grain boundaries is obtained by dividing l by L.

A more specific method for measuring the length I is as follows.

(1) Prior γ grains in an FE-SEM photograph are specified by an inverse analysis of the EBSD measurement results, and 10 prior γ grains, which become measurement subjects, are extracted from the prior γ grains.

(2) Structures that are present to overlap the grain boundaries of the 10 prior γ grains and are determined as martensite or residual austenite (structures that stand out white) are specified.

(3) Lines perpendicular to the prior γ grain boundaries are described at 100 nm intervals in the 10 prior γ grains. With these lines, the image of the structures that are present to overlap the prior γ grain boundaries exhibits a shape in which the structures are sliced at 100 nm intervals perpendicular to the prior γ grain boundaries.

(4) The shape of each of the sliced structures is regarded as a rectangle that is 100 nm in width, and the length x along a direction perpendicular to the priory γ grain boundary of each of the structures is calculated. Specifically, first, the area (unit: $nm^2$) of each of the structures is measured by an image analysis, and then a value x is calculated by dividing the area of each of the structures by 100 nm. This length x corresponds to the width of martensite or residual austenite in the prior γ grain boundary.

(5) Among the sliced structures, structures having a length x along the direction perpendicular to the prior γ grain boundary within a range of 50 nm to 2 μm are extracted.

(6) The lengths of the prior γ grain boundaries covered with the extracted structures are measured, and these lengths are regarded as the above-described "lengths I of the portions covered with martensite and/or austenite having a width of 50 nm to 2 μm".

In addition, the grain boundary thickness is the average value of the lengths x along the direction perpendicular to the prior γ grain boundaries of all of the structures sliced at 100 nm intervals by the above-described method for the measurement of the lengths I. Here, in the calculation of the grain boundary thickness, "the length x along the direction perpendicular to the prior γ grain boundary of each of the sliced structures" in a prior γ grain boundary in which martensite or residual austenite is not present is regarded as 0 nm. In other words, the grain boundary thickness is the average value of the widths of the prior γ grain boundaries in consideration of prior γ grain boundaries covered with neither martensite nor residual austenite and prior γ grain boundaries covered with martensite or residual austenite having a width of more than 2 μm or less than 50 nm.

In normal steel sheets, because carbon segregation into prior γ grain boundaries does not proceed, the amount of martensite and/or residual austenite in the prior γ grain boundaries is small. Therefore, even when a corroded observed section of a normal steel sheet is observed with an FE-SEM, prior γ grain boundaries that stand out white are not recognized in many cases. Therefore, in normal steel sheets, there are cases where prior γ grain boundaries cannot be clearly determined based on FE-SEM photographs. However, because prior γ grains can be specified by an inverse analysis of EBSD measurement results as described above, the grain boundary thicknesses and the grain boundary coverages of normal steel sheets can also be measured according to the above-described method.

Next, the reasons for limiting the chemical composition of the steel sheet according to the present embodiment will be described. Hereinafter, % relating to compositions means mass %. In addition, numerical ranges expressed using "to" means ranges including numerical values before and after "to" as the lower limit and the upper limit unless particularly otherwise described. That is, 0.20% to 0.40% means 0.20% or more and 0.40% or less.

Chemical Composition

C: 0.20% to 0.40%

C is an element that ensures a predetermined amount of martensite and improves the strength of the steel sheet. When the C content is less than 0.20%, because it is difficult to obtain a predetermined amount of martensite and a desired tensile strength cannot be ensured, the C content is set to 0.20% or more. The C content is preferably 0.25% or more.

On the other hand, when the C content exceeds 0.40%, the weldability deteriorates and the hole expansibility deteriorates. In addition, the hydrogen embrittlement resistance also deteriorates. Therefore, the C content is set to 0.40% or less. The C content is preferably 0.35% or less.

Si: 0.10% to 1.0%

Si is a useful element for increasing the strength of the steel sheet by solid solution strengthening. In addition, Si suppresses the formation of cementite and is thus an effective element for forming residual austenite after annealing by accelerating the concentration of C in austenite. Furthermore, Si has an effect of segregating carbon (C) on γ grain boundaries in an annealing step to be described below. When the Si content is 0.10% or less, it becomes difficult to obtain an effect of the above-described action, and it becomes difficult to achieve uniform elongation. Therefore, the hydrogen embrittlement resistance deteriorates, which is not preferable. Therefore, the Si content is set to 0.10% or more, preferably 0.50% or more, and more preferably 0.60% or more.

On the other hand, when the Si content is more than 1.0%, LME cracking (also referred to as liquid metal embrittlement cracking) is likely to occur during welding. Furthermore, the chemical convertibility and the plating property significantly deteriorate. Therefore, the Si content is set to 1.0% or less, preferably 0.90% or less, and more preferably 0.80% or less.

Al: 0.20% to 1.0%

Al is an element having an action of deoxidizing molten steel. In addition, Al has an effect of segregating carbon (C) on γ grain boundaries in the annealing step to be described below. Therefore, in the steel sheet according to the present embodiment, the prior γ grain boundaries are covered with martensite or residual austenite, and a desired tensile strength or a wide elastic deformation region can be obtained. In a case where the Al content is less than 0.20%, because these effects are not exhibited, the Al content is set to 0.20% or more, preferably 0.30% or more, and more preferably 0.40% or more. From the viewpoint of further increasing the elastic limit by segregating more C on grain boundaries, the Al content is more preferably set to more than 0.50%, still more preferably set to 0.55% or more, and particularly preferably set to 0.60% or more.

On the other hand, when the Al content is too high, not only is a surface defect attributed to alumina likely to be generated, but the transformation point significantly increases, and the area ratio of ferrite increases. In this case, it becomes difficult to obtain the above-described metallographic structure, and a sufficient tensile strength cannot be obtained. Furthermore, a high Al content degrades the castability. Therefore, the Al content is set to 1.0% or less, preferably 0.80% or less, and more preferably 0.70% or less.

Si+Al: 0.30% to 1.4%

As described above, both Si and Al are elements having an effect of segregating C in the γ grain boundaries in the annealing step. When Si+Al (total of the Si content and the Al content) is less than 0.30%, the effect of segregating C in the γ grain boundaries in the annealing step cannot be sufficiently obtained, and it becomes difficult to obtain a desired tensile strength. Therefore, Si+Al is set to 0.30% or more, preferably 0.80% or more, and more preferably 1.0% or more.

On the other hand, when Si+Al exceeds 1.4%, the excessive addition of Si and/or Al causes slab cracking, and thus Si+Al is set to 1.4% or less, preferably 1.3% or less, more preferably 1.2% or less.

Mn: 0.1% to 4.0%

Mn has an action of improving the hardenability of steel and is an effective element for obtaining the above-described metallographic structure. When the Mn content is less than 0.1%, it becomes difficult to obtain the above-described metallographic structure. In this case, it becomes impossible to obtain a sufficient tensile strength. Therefore, the Mn content is set to 0.1% or more and preferably 1.0% Of more.

On the other hand, in a case where the Mn content exceeds 4.0%, not only does the effect of improving the hardenability by the segregation of Mn diminishes, but the material cost also increases. Therefore, the Mn content is set to 4.0% or less and preferably 3.5% or less.

P: 0.0200% or less

P is an impurity element and is an element that is segregated in the sheet thickness center portion of the steel sheet to impair the toughness and embrittles a weld. When the P content exceeds 0.0200%, the weld strength or the hole expansibility significantly deteriorates. Therefore, the P content is set to 0.0200% or less. The P content is preferably 0.0100% or less.

The P content is preferably as small as possible; however, when P content is reduced to less than 0.0001% in practical steel sheets, the manufacturing costs significantly increase, which becomes economically disadvantageous. Therefore, the lower limit of the P content may be set to 0.0001%.

S: 0.0200% or Less

S is an impurity element and is an element that impairs the weldability and impairs the manufacturability during casting and during hot rolling. In addition, S is also an element that forms coarse MnS to impair the hole expansibility. When the S content exceeds 0.0200%, the weldability, the manufacturability, and the hole expansibility significantly deteriorate. Therefore, the S content is set to 0.0200% or less.

The S content is preferably as small as possible; however, when the S content is reduced to less than 0.0001% in practical steel sheets, the manufacturing costs significantly increase, which becomes economically disadvantageous. Therefore, the lower limit of the S content may be set to 0.0001%.

N: 0.0200% or Less

N is an element that forms a coarse nitride, impairs the bendability or the hole expansibility, and causes the generation of a blowhole during welding. When the N content exceeds 0.0200%, the deterioration of the hole expansibility or the generation of a blowhole becomes significant. Therefore, the N content is set to 0.0200% or less.

The N content is preferably as small as possible; however, when the N content is reduced to less than 0.0001% in practical steel sheets, the manufacturing costs significantly increase, which becomes economically disadvantageous. Therefore, the lower limit of the N content may be set to 0.0001% or more.

O: 0.0200% or less

O is an element that forms a coarse oxide, impairs the bendability or the hole expansibility, and causes the generation of a blowhole during welding. When the O content exceeds 0.0200%, the deterioration of the hole expansibility or the generation of a blowhole becomes significant. Therefore, the O content is set to 0.0200% or less.

The O content is preferably as small as possible; however, when the O content is reduced to less than 0.0005% in practical steel sheets, the manufacturing costs significantly increase, which becomes economically disadvantageous. Therefore, the lower limit of the O content may be set to 0.0005%.

The steel sheet according to the present embodiment may contain one or more selected from the group consisting of Ni: 0.01% to 1.00%, Mo: 0.01% to 1.00%, Cr: 0.001% to 2.000%, Ti: 0.001% to 0.500%, B: 0.0001% to 0.0100%, Nb: 0.001% to 0.500%, V: 0.001% to 0.500%, Cu: 0.001% to 0.500%, W: 0.001% to 0.10%, Ta: 0.001% to 0.10%, Sn: 0.001% to 0.050%, Co: 0.001% to 0.50%, Sb: 0.001% to 0.050%, As: 0.001% to 0.050%, Mg: 0.0001% to 0.050%, Ca: 0.001% to 0.040%, Y: 0.001% to 0.050%, Zr: 0.001% to 0.050% and La: 0.001% to 0.050%. These elements may not be contained and thus the lower limits may be 0%.

Ni: 0% to 1.00%

Ni is an effective element for improving the strength of the steel sheet. The Ni content may be 0%, but the Ni content is preferably 0.01% or more in order to obtain the above-described effect. On the other hand, when the Ni content is too large, there is a concern that the ductility of the steel sheet may deteriorate to cause the deterioration of the formability. Therefore, the Ni content is preferably 1.00% or less.

Mo: 0% to 1.00%

Similar to Cr, Mo is an element that contributes to high-strengthening of the steel sheet. This effect can be obtained even with a small amount of Mo. The Mo content may be 0%, but the Mo content is preferably 0.01% or more in order to obtain the above-described effect. On the other hand, when the Mo content exceeds 1.00%, a coarse Mo carbide is formed and there is a concern that the cold formability of the steel sheet may deteriorate. Therefore, the Mo content is preferably 1.00% or less.

Cr: 0% to 2.000%

Cr is an element that improves the hardenability of steel and contributes to high-strengthening and is an effective element for obtaining the above-described metallographic structure. Therefore, Cr may be contained. The Cr content may be 0%, but the Cr content is preferably set to 0.001% or more in order to sufficiently obtain the above-described effect.

However, even when Cr is contained excessively, the effect of the above-described action is saturated, which makes it uneconomical to excessively contain Cr. Therefore, even in a case where Cr is contained, the Cr content is set to 2.000% or less.

Ti: 0% to 0.500%

Ti is an important element in controlling the form of carbides. Ti makes it possible to accelerate an increase in the strength of ferrite. In addition, Ti is an element that may form a coarse Ti oxide or TiN to degrade the formability of the steel sheet. Therefore, from the viewpoint of ensuring the formability of the steel sheet, the Ti content is preferably as small as possible, is preferably set to 0.500% or less, and may be 0%. However, reduction in the Ti content to less than 0.001% causes an excessive increase in refining costs, and thus the lower limit of the Ti content may be set to 0.001%.

B: 0% to 0.0100%

B is an element that suppresses the formation of ferrite and pearlite in a cooling process from austenite and accelerates the formation of a low temperature transformation structure such as bainite or martensite. In addition, B is a helpful element for the high-strengthening of steel. This effect can be obtained even with a small amount of B. The B content may be 0%, but the B content is preferably set to 0.0001% or more in order to obtain the above-described effect. However, when the B content is too large, a coarse B oxide is formed, the B oxide serves as a starting point for the generation of voids during press forming, and there is a concern that the formability of the steel sheet may deteriorate. Therefore, the B content is preferably 0.0100% or less. For the identification of less than 0.0001% of B, close attention needs to be paid to analysis. In a case where the B content is below the detection lower limit of an analyzer, the B content may be regarded as 0% in some cases.

Nb: 0% to 0.500%

Similar to Ti, Nb is an effective element for controlling the form of carbides and is also an effective element for improving the toughness of steel sheet by refining the structure. This effect can be obtained even with a small amount of Nb. The Nb content may be 0%, but the Nb content is preferably set to 0.001% or more in order to obtain the above-described effect. However, when the Nb content is too large, a large number of fine and full hard Nb carbides are precipitated, an increase in the strength of the steel sheet and the significant deterioration of the ductility are caused, and there is a concern that the formability of the steel sheet may deteriorate. Therefore, the Nb content is preferably 0.500% or less.

V: 0% to 0.500%

Similar to Ti or Nb, V is also an effective element for controlling the form of carbides and is also an effective element for improving the toughness of steel sheet by refining the structure. The V content may be 0%, but the V content is preferably 0.001% or more in order to obtain the above-described effect. However, when the V content is too large, a large number of fine V carbides are precipitated to cause an increase in the strength and deterioration of the ductility of steel, and there is a concern that the formability of the steel sheet may deteriorate. Therefore, the V content is preferably 0.500% or less.

Cu: 0% to 0.500%

Cu is an element that contributes to improvement in the strength of the steel sheet. This effect can be obtained even with a small amount of Cu. The Cu content may be 0%, but the Cu content is preferably 0.001% or more in order to obtain the above-described effect. However, when the Cu content is too large, there is a concern that red shortness may be caused and productivity in hot rolling may be degraded. Therefore, the Cu content is preferably 0.500% or less.

W: 0% to 0.10%

W is an effective element for improving the strength of the steel sheet. The W content may be 0%, but the W content is preferably 0.001% or more in order to obtain the above-described effect. On the other hand, when the W content is too large, a large number of fine W carbides are precipitated to cause an increase in the strength and deterioration of the ductility of the steel sheet, and there is a concern that the cold workability of the steel sheet may be degraded. Therefore, the W content is set to 0.10% or less.

Ta: 0% to 0.10%

Similar to W, Ta is also an effective element for improving the strength of the steel sheet. The Ta content may be 0%, but the Ta content is preferably 0.001% or more in order to obtain the above-described effect. On the other hand, when the Ta content is too large, a large number of fine Ta carbides are precipitated to cause an increase in the strength and deterioration of the ductility of the steel sheet, and there is a concern that the cold workability of the steel sheet may be degraded. Therefore, the Ta content is set to 0.10% or less, more preferably 0.02% or less, and still more preferably 0.010% or less.

Sn: 0% to 0.050%

Sn is an element that can be contained in the steel sheet in the case of using a scrap as a raw material of the steel sheet. In addition, there is a concern that Sn may cause the deterioration of the cold formability of the steel sheet attributed to the embrittlement of ferrite. Therefore, the Sn content is preferably as small as possible. The Sn content is set to 0.050% or less, is preferably 0.040%, and may be 0%. However, reduction in the Sn content to less than 0.001% causes an excessive increase in refining costs, and thus the Sn content may be set to 0.001% or more.

Co: 0% to 0.50%

Co is an effective element for improving the strength of the steel sheet. The Co content may be 0%, but the Co content is preferably 0.001% or more in order to obtain the above-described effect. On the other hand, when the Co content is too large, there is a concern that the ductility of the steel sheet may deteriorate to cause the deterioration of the formability. Therefore, the Co content is set to 0.50% or less.

Sb: 0% to 0.050%

Similar to Sn, Sb is an element that can be contained in the steel sheet in the case of using a scrap as a raw material of the steel sheet. There is a concern that Sb may be strongly segregated in grain boundaries to cause the embrittlement of the grain boundaries and the deterioration of the ductility or the deterioration of the cold formability. Therefore, the Sb content is preferably as small as possible. The Sb content is set to 0.050% or less, is preferably 0.040%, and may be 0%. However, reduction in the Sb content to less than 0.001% causes an excessive increase in refining costs, and thus the Sb content may be set to 0.001% or more.

As: 0% to 0.050%

Similar to Sn and Sb, As is an element that can be contained in the steel sheet in the case of using a scrap as a raw material of the steel sheet. As is an element that is strongly segregated in grain boundaries, and there is a concern that As may cause the deterioration of the cold formability. Therefore, the As content is preferably as small as possible. The As content is set to 0.050% or less, is preferably 0.040%, and may be 0%. However, reduction in the As content to less than 0.001% causes an excessive increase in refining costs, and thus the As content may be set to 0.001% or more.

Mg: 0% to 0.050%

Mg controls the form of sulfides or oxides and contributes to improvement in bending formability of the steel sheet. This effect can be obtained even with a small amount of Mg. The Mg content may be 0%, but the Mg content is preferably 0.0001% or more in order to obtain the above-described effect. However, when the Mg content is too large, there is a concern that the deterioration of the cold formability may be caused due to the formation of a coarse inclusion. Therefore, the Mg content is set to 0.050% or less and is preferably 0.040% or less.

Ca: 0% to 0.040%

Similar to Mg, Ca is an element capable of controlling the form of sulfides with a small amount. The Ca content may be 0%, but the Ca content is preferably 0.001% or more in order to obtain the above-described effect. However, when the Ca content is too large, a coarse Ca oxide is formed, and the Ca oxide can serve as a starting point for the generation of cracks during cold forming. Therefore, the Ca content is set to 0.040% or less and is preferably 0.030% or less.

Y: 0% to 0.050%

Similar to Mg and Ca, Y is an element capable of controlling the form of sulfides with a small amount. The Y content may be 0%, but the Y content is preferably 0.001% or more in order to obtain the above-described effect. However, when the Y content is too large, a coarse Y oxide is formed, and there is a concern that the cold formability may deteriorate. Therefore, the Y content is set to 0.050% or less and is preferably 0.040% or less.

Zr: 0 to 0.050%

Similar to Mg, Ca, and Y, Zr is an element capable of controlling the form of sulfides with a small amount. The Zr content may be 0%, but the Zr content is preferably 0.001% or more in order to obtain the above-described effect. However, when the Zr content is too large, a coarse Zr oxide is formed, and there is a concern that the cold formability may deteriorate. Therefore, the Zr content is preferably 0.050% or less and more preferably 0.040% or less.

La: 0% to 0.050%

La is an effective element for controlling the form of sulfides with a small amount. The La content may be 0%, but the La content is preferably 0.001% or more in order to obtain the above-described effect. However, when the La content is too large, a La oxide is formed, and there is a concern that the cold formability may deteriorate. Therefore, the La content is set to 0.050% or less and is preferably 0.040% or less.

In the composition of the steel sheet according to the present embodiment, a remainder except the above-described elements is Fe and impurities. The impurities are elements that are incorporated from a steel raw material and/or a steelmaking process and are permitted to be present as long as the characteristics of the steel sheet according to the present embodiment are not impaired.

The steel sheet according to the present embodiment may have a hot-dip galvanized layer on a surface. The composition of the hot-dip galvanized layer of the steel sheet according to the present embodiment is not particularly limited. A plate on the steel sheet according to the present embodiment may be a hot-dip galvanizing or a hot-dip galvannealing or may be an alloyed plate obtained by alloying the above-described plate. In addition, the steel sheet according to the present embodiment is not hindered from having another plate (for example, an aluminum plate or the like).

The hot-dip galvanized layer and the hot-dip galvannealed layer are preferably a plate containing less than 7 mass % of Fe, and the alloyed plate is preferably a plate containing 7 mass % or more and 15 mass % or less of Fe.

Characteristics

[Tensile Strength: 1310 MPa or More]

In the steel sheet according to the present embodiment, as a strength that contributes to the weight reduction of vehicle bodies of automobiles, a tensile strength (TS) of 1310 MPa or more is aimed. From the viewpoint of the impact absorption property, the strength of the steel sheet is preferably 1400 MPa or more and more preferably 1470 MPa or more.

The tensile strength is measured by collecting a JIS No. 5 tensile test piece described in JIS Z 2241: 2011 from an annealing steel sheet in a direction perpendicular to the rolling direction and performing a tensile test in accordance with JIS Z 2241: 2011.

[Work Hardening Rate of More than 180 GPa Up to Region where True Stress Value is 600 MPa or More in Stress-Strain Curve]

Because C is preferably segregated in the prior austenite grain boundaries in the steel sheet according to the present embodiment, a work hardening rate of more than 180 GPa is maintained up to a region where a true stress value is 600 MPa or more in a stress-strain curve. When the steel sheet according to the present embodiment has this characteristic, the elastic deformation region of the steel sheet becomes wide. As a result, the impact energy absorption performance of high strength steel sheets improves, and the high strength steel sheets are preferable for automobile vehicle bodies.

When the work hardening rate is obtained, a tensile test is performed in accordance with JIS Z 2241: 2011 in the same manner as when the tensile strength is measured. From the tensile test results, the nominal stress and the nominal strain are obtained, and the work hardening rate is obtained from the slope. The true stress is also calculated from the tensile test results in the same manner.

Next, a method for manufacturing a steel sheet according to the present embodiment will be described.

The method for manufacturing a steel sheet according to the present embodiment has a hot rolling step of hot rolling a slab having the chemical composition of the steel sheet according to the present embodiment to obtain a hot rolled steel sheet, a cold rolling step of pickling and then cold rolling the hot rolled steel sheet to obtain a cold rolled steel sheet, and an annealing step of annealing the cold rolled steel sheet.

In the annealing step, the cold rolled steel sheet is heated at a heating rate of 1.0° C./s or slower in a temperature range starting from 830° C. and ending at 1° C. that is a temperature of 840° C. to 900° C., held at the 1° C. for $\{T/13-(100\times Si)^{0.8}-(70\times Al)^{0.5}\}$ seconds or longer, and after being held, cooled at an average cooling rate of 20° C./s to 60° C./s up to a cooling stop temperature of 300° C. or lower.

Hereinafter, conditions for each step will be described.

[Hot Rolling Step]

The method for manufacturing a steel sheet according to the present embodiment has a hot rolling step of hot rolling a cast slab having the composition of the steel sheet according to the present embodiment to obtain a hot rolled steel sheet. The hot rolling step according to the present embodiment is not particularly limited and needs to be performed according to a normal method.

[Cold Rolling Step]

The hot rolled steel sheet is pickled and then cold rolled to obtain a cold rolled steel sheet.

After the hot rolling, the hot rolled steel sheet is subjected to pickling and cold rolling. There are no particular restrictions on these steps. For example, pickling may be performed once or may be separately performed a plurality of times as necessary. In the cold rolling, the number of rolling passes and the rolling reduction for each pass may be set as appropriate as long as a rolling reduction of approximately 20% or more and 80% or less can be ensured.

[Annealing Step]

In the annealing step, the cold rolled steel sheet is annealed. At this time, the cold rolled steel sheet is heated at a heating rate of 1.0° C./s or slower in a temperature range of 830° C. to a holding temperature T (840° C. to 900° C.), held at the holding temperature T for $\{T/13-(100\times Si)^{0.8}-(70\times Al)^{0.5}\}$ seconds or longer, and, after being held, cooled at an average cooling rate of 20° C./s to 60° C./s to a cooling stop temperature of 300° C. or lower.

(Heating at Heating Rate of 1.0° C./s or Slower in Temperature Range Starting from 830° C. and Ending at T° C. that is Temperature of 840° C. to 900° C.)

In the annealing step, the cold rolled steel sheet is heated at a heating rate of 1° C./s or slower in a temperature range starting from 830° C. and ending at T° C. that is a temperature of 840° C. to 900° C. That is, the cold rolled steel sheet is heated at a heating rate of no faster than 1.0° C./s in the range of 830° C. to T° C.

In the present embodiment, there is a need to sufficiently segregate C in the prior γ grain boundaries in the annealing step so as to satisfy the requirement that the proportion of martensite or residual austenite having a width of 50 nm to 2 μm present in the prior austenite grain boundaries is 70% or more. At this time, it is required to control heat treatment conditions so that a C-concentrated region having a sufficient width can be formed even when the prior γ grains grow by heating. Therefore, the temperature range that limits the heating rate in the annealing step is set to a temperature range starting from 830° C. and ending at T° C. that is a temperature of 840° C. to 900° C. The T° C. is preferably set to a temperature of the Ac3 point or higher in terms of the structure configuration.

In the case of a heating rate of faster than 1.0° C./s in the temperature range of 830° C. to the holding temperature T, C is not sufficiently segregated in the prior γ grain boundaries, which is not preferable. Furthermore, in the case of a component system having a large Al content (0.20% to 1.0%) as in the present embodiment, the Ac3 point increases. Therefore, in order to sufficiently segregate C in the prior γ grain boundaries while causing austenite reverse transformation and γ growth to sufficiently proceed during heating, there is a need to continuously raise the temperature from 830° C. to T° C. for a long period of time while suppressing the heating rate. Therefore, the heating rate in the temperature range of 830° C. to the holding temperature T° C. is set to 1.0° C./s or slower and it is not preferable that the cold rolled steel sheet is heated at faster than 1.0° C./s or held at a constant temperature in the temperature range. Therefore, the heating rate in the temperature range of 830° C. to the holding temperature T is set to 1.0° C./s or slower and is preferably 0.9° C./s or slower and more preferably 0.8° C./s or slower.

The lower limit of the heating rate in the temperature range is not particularly limited, but may be determined as 0.4° C./s or faster from the viewpoint of productivity. Because "heating" does not include holding at a constant temperature, the heating rate is faster than 0° C./s.

"Heating rate" is a different concept from "average heating rate". In the method for manufacturing a steel sheet according to the present embodiment, the heating rate of the temperature of the steel sheet in the temperature range of 830° C. or higher and the holding temperature T° C. or lower should be within the above-described range at all times.

(Holding at T ° C. for $\{T/13-(100\times Si)^{0.8}-(70\times Al)^{0.5}\}$ Seconds or Longer)

In order to form the C-concentrated region necessary for martensite or residual austenite to cover the prior γ grain boundaries at a predetermined proportion, there is a need to hold the cold rolled steel sheet at a soaking temperature for a sufficient period of time (soaking) after C is concentrated in the grain boundaries by heating the cold rolled steel sheet at the above-described heating rate. When the soaking temperature is low, the cold rolled steel sheet is not annealed to a single austenite phase and a desired metallographic structure cannot be obtained, which is not preferable. Therefore, the soaking temperature is set to 840° C. or higher and is preferably 850° C. or higher. On the other hand, when the soaking temperature is too high, because the manufacturing cost increases, the soaking temperature is set to 900° C. or lower and is preferably 880° C. of lower.

In a case where the retention time in the temperature range of 840° C. to 900° C. is shorter than $\{T/13-(100\times Si)^{0.8}-(70\times Al)^{0.5}\}$ seconds, C does not sufficiently spread over the entire prior γ grain boundaries that have been widened in association with austenite grain growth (C does not sufficiently and fully cover the prior γ grain boundaries) during heating for annealing, and martensite or residual austenite that covers the prior γ grain boundaries at a predetermined proportion is not formed in the cooling step to be described below, which is not preferable. Therefore, the retention time in the temperature range of 840° C. to 900° C. is set to $\{T/13-(100\times Si)^{0.8}-(70\times Al)^{0.5}\}$ seconds or longer.

The upper limit of the retention time is not particularly limited; however, when the cold rolled steel sheet is held for a long period of time, the γ grains become duplex grains and the yield point is lowered due to the presence of coarse grains. Therefore, the retention time may be determined as 400 seconds or shorter.

Si represents the Si content in the unit: mass %, and Al represents the Al content in the unit: mass %.

(After Holding, Cooling at Average Cooling Rate of 20° C./s to 60° C./s Up to Cooling Stop Temperature of 300° C. or Lower)

After the cold rolled steel sheet is held in the above-described temperature range, the cold rolled steel sheet is cooled. In a case where the average cooling rate is slower than 20° C./s, since ferritic transformation, pearlitic transformation, and bainitic transformation are likely to occur, the microstructure of the steel sheet according to the present embodiment cannot be obtained, which is not preferable. Therefore, the average cooling rate is set to 20° C./s or faster and is preferably 25° C./s or faster. On the other hand, in a case where the cooling rate is faster than 60° C./s, it becomes easy for a temperature difference to be generated between the surface and the inside of the steel sheet in the sheet thickness direction, which causes martensitic transformation to occur later on the inside than on the surface side. As a result, an adverse influence such as the distortion of the surface side where martensitic transformation occurs and thus the distortion of the prior γ grain boundaries appears, which is not preferable. Therefore, the average cooling rate is set to 60° C./s or slower and is preferably 55° C./s or slower. When the cooling stop temperature is set to 300° C. or lower, it becomes easy to obtain a desired amount of martensite. In the steel sheet according to the present embodiment, it is possible to achieve the tensile strength of the steel sheet of 1310 MPa or more by ensuring a predetermined amount of martensite. The cooling stop temperature is preferably 250° C. or lower and more preferably 200° C. or lower. On the other hand, when the cooling stop temperature is lower than 25° C., many facilities are required, and the manufacturing cost increases. Therefore, the cooling stop temperature is preferably 25° C. or higher. The cooling stop temperature is more preferably set to 100° C. or higher.

A hot-dip galvanizing step or an alloying step may be performed on the cold rolled steel sheet after the annealing step. In this case, the hot-dip galvanizing method and the alloying method are not particularly limited, and a normal method can be used. As the hot-dip galvanizing method, for example, a method in which the cold rolled steel sheet after the annealing step is controlled to be in a temperature range of (galvanizing bath temperature−40)° C. to (galvanizing bath temperature+50)° C. and immersed in a hot-dip galvanizing bath, thereby forming a hot-dip galvanized steel sheet is an exemplary example. In addition, as the alloying method, for example, a method in which a hot-dip galvanizing is alloyed in a temperature range of 300° C. to 500° C. is an exemplary example.

EXAMPLES

The present invention will be described more specifically with reference to examples.
<Manufacturing Method>
Slabs having a chemical composition shown in Table 1 were cast. The cast slabs were heated to 1100° C., hot-rolled up to 2.8 mm and coiled. After that, the cast slabs were cooled to room temperature. After pickled, the cast slabs were cold-rolled at a cold rolling ratio of 50%. After the cold rolling, the cold rolled steel sheets were annealed under conditions shown in Tables 2-1 and 2-2. In Example No. 34, because slab season cracking occurred, it was not possible to perform steps following the annealing step, and it was not possible to measure the metallographic structure and the characteristics.

TABLE 1

| Kind of steel | Chemical composition (mass %) | | | | | | | | | Ac3 point | Others (unit: mass %) |
|---|---|---|---|---|---|---|---|---|---|---|---|
| | C | Si | Mn | P | S | N | Al | Si + Al | O | | |
| A | 0.29 | 0.75 | 2.1 | 0.0185 | 0.018 | 0.018 | 0.35 | 1.10 | 0.0020 | 824 | |
| B | 0.21 | 0.65 | 2.3 | 0.0092 | 0.003 | 0.0184 | 0.46 | 1.11 | 0.0193 | 846 | |
| C | 0.29 | 0.12 | 1.9 | 0.0181 | 0.017 | 0.018 | 0.87 | 0.99 | 0.0080 | 860 | |
| D | 0.29 | 0.92 | 3.5 | 0.0164 | 0.019 | 0.019 | 0.31 | 1.23 | 0.0001 | 784 | |
| E | 0.37 | 0.38 | 0.2 | 0.0186 | 0.018 | 0.0133 | 0.46 | 0.84 | 0.0003 | 850 | |
| F | 0.22 | 0.63 | 1.3 | 0.0179 | 0.013 | 0.0089 | 0.23 | 0.86 | 0.0014 | 846 | |
| G | 0.26 | 0.23 | 3.6 | 0.0176 | 0.019 | 0.0167 | 0.95 | 1.18 | 0.0012 | 832 | |
| H | 0.30 | 0.14 | 2.5 | 0.005 | 0.010 | 0.005 | 0.21 | 0.35 | 0.0009 | 780 | |
| I | 0.34 | 0.76 | 0.8 | 0.0177 | 0.004 | 0.0173 | 0.60 | 1.36 | 0.0180 | 868 | |
| K | 0.23 | 0.24 | 3.1 | 0.019 | 0.019 | 0.0183 | 0.60 | 0.84 | 0.0019 | 822 | 0.79Ni |
| L | 0.29 | 0.69 | 1.0 | 0.0027 | 0.018 | 0.005 | 0.38 | 1.07 | 0.0016 | 853 | 0.25Mo |
| M | 0.34 | 0.47 | 2.9 | 0.0188 | 0.018 | 0.0188 | 0.50 | 0.97 | 0.0019 | 795 | 0.20Cr |
| N | 0.39 | 0.80 | 2.7 | 0.0185 | 0.005 | 0.019 | 0.32 | 1.12 | 0.0001 | 780 | 0.050Ti |
| O | 0.36 | 0.37 | 1.6 | 0.0174 | 0.017 | 0.018 | 0.68 | 1.05 | 0.0031 | 836 | 0.0016B |
| P | 0.26 | 0.32 | 2.5 | 0.0047 | 0.016 | 0.016 | 0.80 | 1.12 | 0.0007 | 851 | 0.015Nb |
| Q | 0.38 | 0.21 | 0.7 | 0.018 | 0.018 | 0.003 | 0.75 | 0.96 | 0.0146 | 856 | 0.010V |
| R | 0.31 | 0.85 | 1.2 | 0.0137 | 0.009 | 0.019 | 0.42 | 1.27 | 0.0142 | 850 | 0.10Cu |
| S | 0.33 | 0.07 | 1.3 | 0.0029 | 0.005 | 0.005 | 0.41 | 0.48 | 0.0027 | 819 | |
| T | 0.32 | 0.48 | 2.3 | 0.0183 | 0.019 | 0.003 | 0.18 | 0.66 | 0.0033 | 784 | |
| U | 0.23 | 0.24 | 1.8 | 0.0063 | 0.010 | 0.0089 | 1.10 | 1.34 | 0.0009 | 844 | |
| V | 0.27 | 0.10 | 0.8 | 0.0186 | 0.021 | 0.018 | 0.15 | 0.25 | 0.0019 | 820 | |
| W | 0.21 | 0.81 | 2.8 | 0.0179 | 0.018 | 0.018 | 0.67 | 1.48 | 0.0042 | 857 | |
| X | 0.24 | 1.07 | 1.7 | 0.0187 | 0.018 | 0.003 | 0.24 | 1.31 | 0.0061 | 841 | |
| A1 | 0.29 | 0.75 | 2.1 | 0.0010 | 0.018 | 0.018 | 0.49 | 1.24 | 0.0020 | 831 | |
| A2 | 0.29 | 0.75 | 2.1 | 0.0085 | 0.018 | 0.018 | 0.51 | 1.26 | 0.0020 | 838 | |
| A3 | 0.29 | 0.75 | 2.1 | 0.0075 | 0.018 | 0.018 | 0.55 | 1.30 | 0.0020 | 842 | |
| A4 | 0.20 | 0.70 | 2.6 | 0.0065 | 0.004 | 0.018 | 0.40 | 1.10 | 0.0020 | 825 | |
| A5 | 0.25 | 0.65 | 1.0 | 0.0015 | 0.009 | 0.009 | 0.40 | 1.05 | 0.0090 | 857 | 0.02W, 0.02Ta, 0.01Sn |
| A6 | 0.32 | 0.21 | 2.6 | 0.0070 | 0.010 | 0.017 | 0.78 | 0.99 | 0.0140 | 825 | 0.05Co, 0.01Sb, 0.01As |
| A7 | 0.27 | 0.40 | 1.6 | 0.0020 | 0.007 | 0.012 | 0.52 | 0.92 | 0.0100 | 838 | 0.01Mg, 0.01Ca, 0.01Y |
| A8 | 0.22 | 0.81 | 2.0 | 0.0095 | 0.012 | 0.007 | 0.25 | 1.06 | 0.0080 | 828 | 0.01Zr, 0.01La |

TABLE 2-1

| Example No. | Kind of steel | Slab season cracking | Annealing heating rate at 830° C. to holding temperature T [° C./s] | Annealing holding temperature [° C.] | Annealing retention time [s] | {T/13 − (100 × Si)$^{0.8}$ − (70 × Al)$^{0.5}$} | Average cooling rate after annealing [° C./s] | Note |
|---|---|---|---|---|---|---|---|---|
| 1 | A | — | 0.8 | 870 | 55 | 30 | 30 | Invention Example |
| 2 | B | — | 0.8 | 870 | 63 | 33 | 30 | Invention Example |
| 3 | C | — | 0.8 | 870 | 70 | 52 | 30 | Invention Example |
| 4 | D | — | 0.8 | 870 | 34 | 25 | 30 | Invention Example |
| 5 | E | — | 0.8 | 870 | 50 | 43 | 30 | Invention Example |
| 6 | F | — | 0.8 | 870 | 67 | 35 | 30 | Invention Example |
| 7 | G | — | 0.8 | 870 | 60 | 46 | 30 | Invention Example |
| 8 | H | — | 0.8 | 870 | 72 | 55 | 30 | Invention Example |
| 9 | I | — | 0.8 | 870 | 58 | 28 | 30 | Invention Example |
| 10 | B | — | 0.9 | 870 | 38 | 33 | 50 | Invention Example |
| 11 | C | — | 0.6 | 895 | 87 | 54 | 50 | Invention Example |
| 12 | D | — | 0.6 | 845 | 51 | 23 | 50 | Invention Example |
| 13 | F | — | 0.6 | 870 | 36 | 35 | 50 | Invention Example |
| 14 | G | — | 0.6 | 870 | 55 | 46 | 22 | Invention Example |
| 15 | H | — | 0.6 | 870 | 76 | 55 | 58 | Invention Example |
| 16 | A | — | <u>3</u> | 870 | 40 | 30 | 40 | Comparative Example |
| 17 | A | — | 0.7 | <u>950</u> | 49 | 37 | 40 | Comparative Example |
| 18 | A | — | 0.7 | <u>800</u> | 53 | 25 | 40 | Comparative Example |
| 19 | A | — | 0.7 | 850 | <u>28</u> | 29 | 40 | Comparative Example |
| 20 | A | — | 0.7 | 850 | <u>43</u> | 29 | <u>63</u> | Comparative Example |
| 21 | A | — | 0.7 | 850 | 50 | 29 | <u>3</u> | Comparative Example |
| 22 | K | — | 0.8 | 870 | 75 | 48 | 35 | Invention Example |
| 23 | L | — | 0.8 | 870 | 65 | 32 | 35 | Invention Example |

TABLE 2-2

| Example No. | Kind of steel | Slab season cracking | Annealing heating rate at 830° C. to holding temperature T [° C./s] | Annealing holding temperature [° C.] | Annealing retention time [s] | {T/13 − (100 × Si)$^{0.8}$ − (70 × Al)$^{0.5}$} | Average cooling rate after annealing [° C./s] | Note |
|---|---|---|---|---|---|---|---|---|
| 24 | M | — | 0.8 | 870 | 62 | 39 | 35 | Invention Example |
| 25 | N | — | 0.8 | 870 | 36 | 29 | 35 | Invention Example |
| 26 | O | — | 0.8 | 870 | 63 | 42 | 35 | Invention Example |
| 27 | P | — | 0.8 | 870 | 59 | 43 | 35 | Invention Example |
| 28 | Q | — | 0.8 | 870 | 54 | 48 | 35 | Invention Example |
| 29 | R | — | 0.8 | 870 | 53 | 27 | 35 | Invention Example |
| 30 | <u>S</u> | — | 0.6 | 870 | 72 | 57 | 40 | Comparative Example |
| 31 | <u>T</u> | — | 0.6 | 870 | 59 | 41 | 40 | Comparative Example |
| 32 | <u>U</u> | — | 0.6 | 870 | 69 | 45 | 40 | Comparative Example |
| 33 | <u>V</u> | — | 0.6 | 870 | 82 | 57 | 40 | Comparative Example |
| 34 | <u>W</u> | Season cracking | Subsequent test stopped | | | | | Comparative Example |
| 35 | <u>X</u> | — | 0.6 | 870 | 50 | 21 | 40 | Comparative Example |
| 36 | A1 | — | 0.8 | 870 | 55 | 29 | 30 | Invention Example |
| 37 | A2 | — | 0.8 | 870 | 55 | 29 | 30 | Invention Example |
| 38 | A3 | — | 0.8 | 870 | 55 | 29 | 30 | Invention Example |
| 39 | A3 | — | <u>1.1</u> | 870 | 55 | 29 | 30 | Comparative Example |
| 40 | A4 | — | <u>1.1</u> | 870 | 55 | 32 | 30 | Comparative Example |
| 41 | A5 | — | 0.7 | 880 | 62 | 34 | 35 | Invention Example |
| 42 | A6 | — | 0.7 | 880 | 90 | 49 | 35 | Invention Example |
| 43 | A7 | — | 0.7 | 850 | 59 | 40 | 35 | Invention Example |
| 44 | A8 | — | 0.7 | 850 | 75 | 28 | 35 | Invention Example |
| 45 | B | — | 0.9 | 870 | 38 | 33 | <u>18</u> | Comparative Example |

<Measurement of Metallographic Structure>

A test piece for SEM observation was collected from the obtained annealing steel sheet, a longitudinal section parallel to a rolling direction was polished, then, the metallographic structure at a sheet thickness ¼ portion was observed, and the area ratio of each structure was measured by image processing. The area ratio of each structure is shown in Tables 3-1 and 3-2. In Tables 3-1 and 3-2, "the proportion of martensite or residual austenite having a width of 50 nm to 2 μm present in prior austenite grain boundaries" is referred to as "grain boundary coverage". The methods for measuring the grain boundary thickness and the grain boundary coverage are as described above.

<Measurement of Characteristics>
(Tensile Strength)
The tensile strength was measured by collecting a JIS No. 5 tensile test piece from the annealing steel sheet in a direction perpendicular to the rolling direction and performing a tensile test in accordance with JIS Z 2241: 2011.

The measurement results of the tensile strength are shown in Tables 3-1 and 3-2.

(Work Hardening Rate and True Stress)
First, a tensile test was performed in accordance with JIS Z 2241: 2011 in the same manner as when the tensile strength was measured. From the tensile test results, the nominal stress and the nominal strain were obtained, and the work hardening rate was obtained from the slope. The true stress was also calculated from the tensile test results in the same manner. The measurement results of the work hardening rate and the true stress are shown in Tables 3-1 and 3-2. In Tables 3-1 and 3-2, true stresses at which the work hardening rate (abbreviated as WHR in the tables) became 180 GPa are shown. When this value is 600 MPa or more, it can be said that a work hardening rate of more than 180 GPa is maintained up to a region where the true stress value is 600 MPa or more in a stress-strain curve.

TABLE 3-1

| Example No. | Kind of steel | Area ratio of retained γ [%] | Total area ratio of ferrite, bainite, and pearlite [%] | Area ratio of martensite [%] | Grain boundary thickness [μm] | Grain boundary coverage [%] | TS [MPa] | True stress at which WHR = 180 GPa [MPa] | Note |
|---|---|---|---|---|---|---|---|---|---|
| 1 | A | 6 | 1 | 93 | 0.82 | 91 | 1796 | 824 | Invention Example |
| 2 | B | 3 | 2 | 95 | 0.81 | 87 | 1487 | 652 | Invention Example |
| 3 | C | 5 | 6 | 89 | 0.063 | 83 | 1765 | 650 | Invention Example |
| 4 | D | 6 | 1 | 93 | 1.2 | 92 | 1824 | 799 | Invention Example |
| 5 | E | 7 | 10 | 83 | 0.35 | 71 | 1821 | 726 | Invention Example |
| 6 | F | 6 | 4 | 90 | 0.065 | 74 | 1497 | 622 | Invention Example |
| 7 | G | 5 | 9 | 86 | 0.89 | 88 | 1524 | 679 | Invention Example |
| 8 | H | 1 | 3 | 96 | 0.053 | 72 | 1809 | 634 | Invention Example |
| 9 | I | 12 | 4 | 84 | 1.3 | 95 | 1879 | 860 | Invention Example |
| 10 | B | 4 | 4 | 92 | 0.052 | 71 | 1495 | 610 | Invention Example |
| 11 | C | 7 | 4 | 89 | 0.051 | 72 | 1753 | 618 | Invention Example |
| 12 | D | 10 | 5 | 85 | 1.8 | 94 | 1822 | 817 | Invention Example |
| 13 | F | 6 | 4 | 90 | 0.051 | 74 | 1488 | 603 | Invention Example |
| 14 | G | 4 | 10 | 86 | 0.82 | 89 | 1503 | 688 | Invention Example |
| 15 | H | 2 | 2 | 96 | 0.053 | 73 | 1836 | 741 | Invention Example |
| 16 | A | 4 | 4 | 92 | 0.043 | <u>65</u> | 1631 | <u>576</u> | Comparative Example |
| 17 | A | 4 | 3 | 93 | 0.038 | <u>66</u> | 1637 | <u>582</u> | Comparative Example |
| 18 | A | 6 | <u>21</u> | 73 | 2.1 | <u>67</u> | <u>1290</u> | 624 | Comparative Example |
| 19 | A | <u>2</u> | 3 | 95 | 0.047 | <u>64</u> | <u>1628</u> | <u>573</u> | Comparative Example |
| 20 | A | <u>0</u> | 1 | 99 | 0.61 | 84 | 1634 | <u>589</u> | Comparative Example |
| 21 | A | <u>3</u> | <u>42</u> | 55 | 0.69 | 89 | <u>1252</u> | <u>567</u> | Comparative Example |
| 22 | K | 1 | <u>2</u> | 97 | 0.43 | 76 | <u>1582</u> | 657 | Invention Example |
| 23 | L | 3 | 6 | 91 | 0.84 | 89 | 1777 | 739 | Invention Example |

TABLE 3-2

| Example No. | Kind of steel | Area ratio of retained γ [%] | Total area ratio of ferrite, bainite, and pearlite [%] | Area ratio of martensite [%] | Grain boundary thickness [μm] | Grain boundary coverage [%] | TS [MPa] | True stress at which WHR = 180 GPa [MPa] | Note |
|---|---|---|---|---|---|---|---|---|---|
| 24 | M | 3 | 3 | 94 | 0.61 | 84 | 1889 | 804 | Invention Example |
| 25 | N | 4 | 1 | 95 | 1 | 91 | 1956 | 821 | Invention Example |
| 26 | O | 3 | 2 | 95 | 0.97 | 88 | 1905 | 790 | Invention Example |
| 27 | P | 2 | 1 | 97 | 0.46 | 78 | 1651 | 686 | Invention Example |
| 28 | Q | 3 | 8 | 89 | 0.57 | 73 | 1923 | 838 | Invention Example |
| 29 | R | 1 | 2 | 97 | 0.87 | 79 | 1824 | 769 | Invention Example |
| 30 | <u>S</u> | 2 | 6 | 92 | 0.035 | <u>65</u> | 1828 | <u>583</u> | Comparative Example |
| 31 | <u>T</u> | 7 | 1 | 92 | 0.042 | <u>68</u> | 1792 | <u>597</u> | Comparative Example |
| 32 | <u>U</u> | 4 | <u>20</u> | 76 | 1.3 | <u>65</u> | <u>1295</u> | <u>571</u> | Comparative Example |
| 33 | <u>V</u> | 2 | 1 | 97 | 0.025 | <u>61</u> | 1687 | <u>542</u> | Comparative Example |
| 34 | <u>W</u> | — | — | — | — | — | — | — | Comparative Example |
| 35 | <u>X</u> | 4 | 6 | 90 | 1.25 | 76 | 1721 | 752 | Comparative Example |
| 36 | A1 | 6 | 2 | 92 | 0.91 | 90 | 1805 | 824 | Invention Example |
| 37 | A2 | 6 | 2 | 92 | 0.95 | 88 | 1812 | 835 | Invention Example |
| 38 | A3 | 7 | 3 | 90 | 1.05 | 92 | 1824 | 847 | Invention Example |
| 39 | A3 | 7 | 5 | 88 | 0.051 | <u>68</u> | 1789 | <u>587</u> | Comparative Example |
| 40 | A4 | 4 | 2 | 94 | 0.047 | <u>66</u> | 1475 | <u>574</u> | Comparative Example |
| 41 | A5 | 3 | 7 | 90 | 0.76 | 89 | 1704 | 739 | Invention Example |
| 42 | A6 | 7 | 4 | 89 | 0.46 | 84 | 1854 | 770 | Invention Example |
| 43 | A7 | 3 | 5 | 92 | 0.42 | 82 | 1777 | 752 | Invention Example |

TABLE 3-2-continued

| Example No. | Kind of steel | Area ratio of retained γ [%] | Total area ratio of ferrite, bainite, and pearlite [%] | Area ratio of martensite [%] | Grain boundary thickness [μm] | Grain boundary coverage [%] | TS [MPa] | True stress at which WHR = 180 GPa [MPa] | Note |
|---|---|---|---|---|---|---|---|---|---|
| 44 | A8 | 3 | 4 | 93 | 0.102 | 73 | 1521 | 668 | Invention Example |
| 45 | B | 1 | 27 | 72 | 0.054 | 71 | 1301 | 589 | Comparative Example |

As shown in Table 3-1 and 3-2, in the examples according to the present invention, the tensile strength was 1310 MPa or more and a work hardening rate of more than 180 GPa was maintained up to a region where the true stress value was 600 MPa or more in the stress-strain curve. Particularly, in the examples where the Al content was more than 0.50%, 0.55% or more, or 0.60% or more (for example, Example Nos. 9, 38, 42, and the like), a tendency for these values to become favorable was obtained. On the other hand, in the comparative example where at least one of the requirements of the present invention was not satisfied, not all of the characteristics were favorable. Particularly, according to Example Nos. 39 and 40, it was found that favorable results could not be obtained even when the heating rate in the temperature range of 830° C. to the holding temperature T (840° C. to 900° C.) slightly exceeded 1.0° C./s (=1.1° C./s).

In addition, from the plated steel sheets obtained by performing hot-dip galvanizing or hot-dip galvanizing and an alloying treatment on the above-described steel sheets, the physical properties of the present embodiment (the tensile strength is 1310 MPa or more and a work hardening rate of more than 180 GPa is maintained up to a region where the true stress value is 600 MPa or more in a stress-strain curve) could be obtained.

(LME Resistance)

Subsequently, slabs having a chemical composition of kind of steel A, C, D, or X in Table 1 were cast, and the manufacturing conditions of Example No. 1 were applied thereto, thereby manufacturing steel sheets. 50 mm×80 mm test pieces were collected from the manufactured steel sheets. In addition, a slab having the chemical composition of A in Table 1 was cast, the manufacturing conditions of Example No. 1 were applied thereto, and then the slab was immersed in a hot-dip galvanizing bath, thereby manufacturing a hot-dip galvanized steel sheet. A 50 mm×80 mm test piece was collected from the manufactured steel sheet.

FIG. 1 shows the appearance of a test in which two steel sheets are spot-welded and liquid metal embrittlement cracking resistance is evaluated. The hot-dip galvanized steel sheet was used as a steel sheet 1d in FIG. 1, and two steel sheets, which were evaluation subjects, were overlapped together as a steel sheet 1e and spot-welded with a pair of electrodes 4a and 4b. The welding conditions are as follows.

The plated steel sheets were welded together using a servomotor pressurized single-phase alternating-current spot welder (power frequency: 50 Hz) while being pressurize at a pressure of 450 kgf (4413 kg·m/s$^2$) under conditions of a current value set to 6.5 kA, an inclined angle of the electrodes set to 3°, no up slope, an energization time set to 0.4 seconds, and a retention time after the end of energization of 0.1 seconds. After that, the steel structure in the region of the central part in the nugget of the steel sheet was observed using an optical microscope. A case where no cracks were generated was evaluated as A, a case where cracks having a length of less than 500 μm were observed was evaluated as B, and a case where cracks having a length of 500 μm or more were observed was evaluated as C. Cases that were evaluated as A and B were passed.

The steel sheets having a chemical composition of the kind of steel A or C and the hot-dip galvanized steel sheet having the chemical composition of the kind of steel A were evaluated as A and showed extremely favorable LME resistance. The steel sheet having the chemical composition of the kind of steel D was evaluated as B.

On the other hand, the steel sheet having a chemical composition of the kind of steel X in which the Si content deviated from the present embodiment was evaluated as C and did not show sufficient LME resistance.

INDUSTRIAL APPLICABILITY

According to the present invention, it is possible to provide a steel sheet having a tensile strength of 1310 MPa or more and having a work hardening rate of more than 180 GPa that is maintained up to a region where a true stress value is 600 MPa or more in a stress-strain curve and a method for manufacturing the same.

The invention claimed is:

1. A steel sheet comprising, as a chemical composition, by mass %:
C: 0.20% to 0.40%;
Si: 0.10% to 1.0%;
Al: 0.20% to 1.0%;
Mn: 0.1% to 4.0%;
P: 0.0200% or less;
S: 0.0200% or less;
N: 0.0200% or less;
O: 0.0200% or less;
Ni: 0% to 1.00%;
Mo: 0% to 1.00%;
Cr: 0% to 2.000%;
Ti: 0% to 0.500%;
B: 0% to 0.0100%;
Nb: 0% to 0.500%;
V: 0% to 0.500%;
Cu: 0% to 0.500%;
W: 0% to 0.10%;
Ta: 0% to 0.10%;
Sn: 0% to 0.050%;
Co: 0% to 0.50%;
Sb: 0% to 0.050%;
As: 0% to 0.050%;
Mg: 0% to 0.050%;
Ca: 0% to 0.040%;
Y: 0% to 0.050%;
Zr: 0% to 0.050%;
La: 0% to 0.050%; and
a remainder including iron and impurities,
wherein Si+Al satisfies 0.30% to 1.4%,
a metallographic structure in a sheet thickness ¼ portion includes, by an area ratio, ferrite, bainite and pearlite: 0% to 10% in total,
residual austenite: 1% to 15%, and
a remainder that is martensite, and
a proportion of martensite or residual austenite having a width of 50 nm to 2 μm present at a prior austenite grain boundary is 70% or more.

2. The steel sheet according to claim 1,
wherein the chemical composition contains, by mass %, one or more selected from the group of:
Ni: 0.01% to 1.00%,
Mo: 0.01% to 1.00%,
Cr: 0.001% to 2.000%,
Ti: 0.001% to 0.500%,
B: 0.0001% to 0.0100%,
Nb: 0.001% to 0.500%,
V: 0.001% to 0.500%,
Cu: 0.001% to 0.500%,
W: 0.001% to 0.10%,
Ta: 0.001% to 0.10%,
Sn: 0.001% to 0.050%,
Co: 0.001% to 0.50%,
Sb: 0.001% to 0.050%,
As: 0.001% to 0.050%,
Mg: 0.0001% to 0.050%,
Ca: 0.001% to 0.040%,
Y: 0.001% to 0.050%,
Zr: 0.001% to 0.050%, and
La: 0.001% to 0.050%.

3. The steel sheet according to claim 1, further comprising:
a hot-dip galvanized layer on a surface.

4. The steel sheet according to claim 1, further comprising:
a hot-dip galvannealed layer on a surface.

5. The steel sheet according to claim 1,
wherein a grain boundary thickness of prior austenite is 50 nm to 2 μm.

6. The steel sheet according to claim 2, further comprising:
a hot-dip galvanized layer on a surface.

7. The steel sheet according to claim 2, further comprising:
a hot-dip galvannealed layer on a surface.

8. The steel sheet according to claim 2,
wherein a grain boundary thickness of prior austenite is 50 nm to 2 μm.

9. The steel sheet according to claim 3,
wherein a grain boundary thickness of prior austenite is 50 nm to 2 μm.

10. The steel sheet according to claim 4,
wherein a grain boundary thickness of prior austenite is 50 nm to 2 μm.

11. A method for manufacturing a steel sheet, comprising:
hot rolling a slab having the chemical composition according to claim 1 to obtain a hot rolled steel sheet;
pickling and then cold rolling the hot rolled steel sheet to obtain a cold rolled steel sheet; and
annealing the cold rolled steel sheet,
wherein, in the annealing,
the cold rolled steel sheet is heated at a heating rate of 1.0° C./s or slower in a temperature range starting from 830° C. and ending at T° C. that is a temperature of 840° C. to 900° C.,
held at the T° C. for $\{T/13-(100\times Si)^{0.8}-(70\times Al)^{0.5}\}$ seconds or longer, and,
after being held, cooled at an average cooling rate of 20° C./s to 60° C./s up to a cooling stop temperature of 300° C. or lower.

12. The method for manufacturing a steel sheet according to claim 11,
wherein the cold rolled steel sheet after the annealing is controlled to be in a temperature range of (galvanizing bath temperature−40)° C. to (galvanizing bath temperature+50° C.) and immersed in a hot-dip galvanizing bath, thereby forming a hot-dip galvanizing.

13. The method for manufacturing a steel sheet according to claim 12,
wherein the hot-dip galvanizing is alloyed in a temperature range of 300° C. to 500° C.

14. A method for manufacturing a steel sheet, comprising:
hot rolling a slab having the chemical composition according to claim 2 to obtain a hot rolled steel sheet;
pickling and then cold rolling the hot rolled steel sheet to obtain a cold rolled steel sheet; and
annealing the cold rolled steel sheet,
wherein, in the annealing,
the cold rolled steel sheet is heated at a heating rate of 1.0° C./s or slower in a temperature range starting from 830° C. and ending at T° C. that is a temperature of 840° C. to 900° C.,
held at the T° C. for $\{T/13-(100\times Si)^{0.8}-(70\times Al)^{0.5}\}$ seconds or longer, and,
after being held, cooled at an average cooling rate of 20° C./s to 60° C./s up to a cooling stop temperature of 300° C. or lower.

* * * * *